(12) United States Patent
Seol et al.

(10) Patent No.: US 7,395,543 B2
(45) Date of Patent: Jul. 1, 2008

(54) DISC CHUCKING APPARATUS AND DISC PLAYER HAVING THE SAME

(75) Inventors: Young-yun Seol, Seoul (KR);
Hwan-seung Lee, Yongin-si (KR);
Jung-jae Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 578 days.

(21) Appl. No.: 11/176,251

(22) Filed: Jul. 8, 2005

(65) Prior Publication Data

US 2006/0031860 A1     Feb. 9, 2006

(30) Foreign Application Priority Data

Aug. 7, 2004     (KR) ...................... 10-2004-0062227

(51) Int. Cl.
*G11B 7/08* (2006.01)
(52) U.S. Cl. ..................................... 720/658
(58) Field of Classification Search ................. 720/703, 720/706, 713, 658; 369/191.1
See application file for complete search history.

(56) References Cited

U.S. PATENT DOCUMENTS

| | | | | |
|---|---|---|---|---|
| 4,695,996 | A | * | 9/1987 | Sugihara et al. ............. 720/623 |
| 6,097,693 | A | * | 8/2000 | Nakamichi ................... 720/713 |
| 7,107,603 | B2 | * | 9/2006 | Tuchiya ........................ 720/713 |
| 2003/0021221 | A1 | * | 1/2003 | Fujimura ..................... 369/270 |
| 2005/0060734 | A1 | * | 3/2005 | Aoyama et al. ............. 720/706 |

FOREIGN PATENT DOCUMENTS

| | | |
|---|---|---|
| JP | 2002-184079 | 6/2002 |
| JP | 2002-298548 | 10/2002 |
| KR | 2000-9215 | 5/2000 |
| KR | 2000-27123 | 5/2000 |

* cited by examiner

*Primary Examiner*—Angel A Castro
(74) *Attorney, Agent, or Firm*—Staas & Halsey LLP

(57) ABSTRACT

A disc chucking apparatus for seating a disc on a turntable in the rotatable state and a disc player having such a disc chucking apparatus is provided. The disc chucking apparatus includes a chuck bracket having a clamper for clamping a disc to a turntable; and a lifting/lowering unit for lifting or lowering the chuck bracket to move the disc to a clamping position where the disc is seated on the turntable in the rotatable state or to a clamping standby position where the disc is separated from the turntable. The lifting/lowering unit includes: a first protrusion part formed at one of first and second ends of the chuck bracket; and a first slider having a first guide slot part formed to be opposite to the first protrusion part so that the first guide slot part receives and guides the first protrusion part to lift or lower the chuck bracket, wherein the first slider is mounted to be capable of reciprocating in the disc loading direction and selectively connected to a power transmission unit, which transmits power from a driving motor, depending on its moving position, thereby being reciprocated. According to the present invention, because the chuck bracket for fixing a clamper for clamping a disc is directly driven by the first slider which is selectively connected to a power transmission unit and reciprocated without intervention of a separate power transmission member such as a subordinate chassis, power transmission to the chuck bracket is smooth and the operation of the chuck can be smoothly executed.

20 Claims, 16 Drawing Sheets

DISC CHUCKING APPARATUS AND DISC PLAYER HAVING THE SAME

CROSS-REFERENCE TO RELATED APPLICATIONS

This application claims the benefit of Korean Patent Application No. 2004-62227 filed on Aug. 7, 2004 in the Korean Intellectual Property Office, the disclosure of which is incorporated herein by reference.

BACKGROUND OF THE INVENTION

1. Field of the Invention

The present invention relates to a disc player for recording information into and/or reproducing recorded information from a disc such as a compact disc (CD), a CD-ROM, a digital video disc (DVD), and a DVD-ROM. More particularly, the present invention relates to a disc chucking apparatus for seating a disc on a turntable in a rotatable state and a disc player having the same.

2. Description of the Related Art

In general, a disc player includes a disc loading system for loading a disc to a position for recording information into and/or reproducing recorded information from the disc. The disc loading system loads a disc inserted into the disc player from the front direction thereof to a chucking position on a turntable and then seats the disc on the turntable using a disc chucking apparatus. After the disc has been seated on the turntable, the disc player may record information into or reproduce recorded information from the disc as an optical pickup moves in a radial direction of the disc while the disc is rotating on the turntable.

FIGS. 1 to 3 show a conventional car disc player.

The disc player has a disc chucking apparatus 80 for chucking a first disc 1 having a size of 120 mm or a second disc 2 having a size of 80 mm onto a turntable 95.

The disc chucking apparatus 80 includes a chuck bracket 81 mounted on a main chassis 10 that is pivotal up and down by a hinge axle 86, a subordinate chassis 60 for pivoting the chuck bracket 81 up and down, and a slider 30 for moving the subordinate chassis 60 in the B1 and B2 directions (see FIGS. 2 and 5).

The front end of the chuck bracket 81 located opposite to the hinge axle 86 is provided with a clamper 90 for clamping the first or second disc 1 or 2 to the turntable 95 and the rear end thereof is formed with a first vertical surface 82 by bending. The first vertical surface 82 has a protrusion pin 83 projected toward the subordinate chassis 60.

The subordinate chassis 60 has a second vertical surface 67 formed by bending that is opposite to the first vertical surface 82 of the chuck bracket 81. As shown in FIG. 2, the second vertical surface 67 has a guide slot 68 for receiving and guiding the protrusion pin 83.

A cam slit 61 is formed on one side of the subordinate chassis 60 adjacent to the slider 30.

The rear end of the slider 30 is formed with a cam lug 33 that is inserted into the cam slit 61 of the subordinate chassis 60. The cam slit 61 is guided as the cam lug 33 moves in the A1 and A2 directions, thereby moving the subordinate chassis 60 in the B1 and B2 directions.

Now, the disc loading operation of the disc player configured as described above is described.

As shown in FIG. 1, if a disc, e.g., a first disc 1 having a size of 120 mm is inserted into a housing 50 in the loading direction, i.e., in the A1 direction, a controller (not shown) drives a driving motor 21 (see FIG. 3) on the basis of a signal from a disc detection sensor (not shown) for detecting the entry of the first disc 1. As a result, the first disc 1 is drawn into the housing 50 by a transfer roller 11, wherein the transfer roller 11 receives power from the driving motor 21 through a plurality of connection gears 22, 23, 24, 25, 26.

Thereafter, if the first disc 1 pushes first and second guide rollers 43, 44 of the first and second pivot plates 41, 42, the first and second pivot plates 41, 42 pivot in the C and D directions. Consequently, a contact part 47 of the second pivot plate 42 pushes one end 49 of a first pushing lever 48. Then, while the first pushing lever 48 is rotating in the C direction, the other end 51 of the first pushing lever 48 pushes the slider 30 for a predetermined distance in the A2 direction.

Thereby, a rack gear 31 is connected to a driving gear 32 which receives power of the of the driving motor 21 transmitted through the plurality of connection gears 22, 23, 33, 34 as shown in FIG. 3, with the result that the power of the driving gear 32 is transmitted to the rack gear 31 and the slider 30 is continuously moved in the A2 direction. As the slider 30 moves, the cam slit 61 of the subordinate chassis 60 is guided by the movement of the cam lug 33 of the slider 30 and the subordinate chassis 60 is moved in the B1 direction, as shown in FIGS. 4 and 5.

If the subordinate chassis 60 moves in the B1 direction as mentioned above, the guide slot 68 in the second vertical surface 67 of the subordinate chassis 60 also moves in the B1 direction as shown in FIG. 5. As a result, the protrusion pin 83 of the first vertical surface 82 is guided and lowered by the guide slot 68. As the protrusion pin 83 is lowered, the chuck bracket 81 pivots counterclockwise about the hinge axle 86 thereby being lowered, and the clamper 90 installed at the front end of the chuck bracket 81 rotatably clamps the first disc 1 to the turntable 95.

The first disc 1 clamped as described above is unloaded as follows.

At first, the driving motor 21 is reversely rotated to return the slider 30 in the A1 direction. Then, as shown in FIGS. 1 and 2, the subordinate chassis 60 is also returned to its original position by moving in the B2 direction. Then, the disc chucking apparatus 80 is operated in a reversed sequence with reference to the first disc loading operation, and the first disc 1 is released from the clamper 90 and discharged out of the housing 50 by the transfer roller 11.

However, the conventional car disc player configured as described above has a problem in that the operating connection from the slider 30 to the chuck bracket 81 is not smooth because the disc chucking apparatus 80 employs a complicated operating construction in which the subordinate chassis 60 is moved in the B1 and B2 directions by the movement of slider 30 in the A1 and A2 directions and the disc chucking apparatus 80 is in turn pivoted up and down by the subordinate chassis 60.

If the operating connection from the slider 30 to the chuck bracket 81 is not smooth the slider 30, the subordinate chassis 60 and the chassis 81 may adhere to one another without being moved, thereby causing malfunction.

In order to solve this problem, an additional sliding roller (not shown) is provided or lubricant is additionally supplied between the subordinate chassis 60 and the main chassis 10 which supports the subordinate chassis 60, with the result that additional components or processes are required, thereby increasing the manufacturing costs.

In addition, because the conventional car disc player has a construction in which the chuck bracket 81 anchoring the clamper 90 for clamping a disc is pivoted up and down by the hinge axle 86, the operating space of the chuck bracket 81 is larger than the actual height for lifting and lowering the clamper 90, with the result that the entire thickness of the disc player is increased.

SUMMARY OF THE INVENTION

Additional aspects and/or advantages of the invention will be set forth in part in the description which follows and, in part, will be apparent from the description, or may be learned by practice of the invention.

Accordingly, the present invention has been made to solve the above-mentioned problems, and an aspect of the present invention is to provide a chucking apparatus, in which a chuck bracket for anchoring a clamper for clamping a disc on a turntable is simplified so that malfunction can be prevented, and a disc player having such a chucking apparatus.

In order to achieve the above-mentioned aspect, there is provided a disc chucking apparatus of a disc player including: a chuck bracket having a clamper for clamping a disc to a turntable; and a lifting/lowering unit for lifting or lowering the chuck bracket to move the disc to a clamping position where the disc is seated on the turntable in the rotatable state or to a clamping standby position where the disc is separated from the turntable. The lifting/lowering unit includes: a first protrusion part formed at one of the first and second ends of the chuck bracket; and a first slider having a first guide slot part formed to be opposite to the first protrusion part so that the first guide slot part receives and guides the first protrusion part to lift or lower the chuck bracket, where the first slider is mounted to be capable of reciprocating in the disc loading direction and selectively connected to a power transmission unit, which transmits power from a driving motor, depending on its moving position, thereby being reciprocated.

The lifting/lowering unit may further include: a second protrusion part formed at the other of the first and second ends of the chuck; a second slider having a second guide slot part formed to be opposite to the second protrusion part so that the second guide slot part receives and guides the second protrusion part to lift or lower the chuck bracket, wherein the second slider is mounted to be capable of reciprocating in the disc loading direction; and a connecting member for connecting the second slider with the first slider.

The first and second protrusion parts may each have two protrusion pins and the first and second guide slot parts may each have two guide slots. Each of the guide slots may have an ascent slot, a descent slot and a slant slot interconnecting the ascent slot and the descent slot.

The connecting member may include either one of a rod or a bar, of which the opposite ends are connected to the first and second sliders, respectively. Instead of being configured by a rod or a bar, the connecting member may include: a shaft rotatably mounted on the main chassis; first and second pinion gears fixed to the opposite ends of the shaft, respectively; and first and second rack gears formed in the first and second sliders, respectively, to be meshed with the first and second pinion gears.

Alternatively, the lifting/lowering unit may further include a hinge axle formed at the other of the first and second ends of the chuck bracket instead of further including the second projection part, the second slider and the connecting member.

According to another aspect of the present invention, there is provided a disc chucking apparatus of a disc player including: a chuck bracket having a clamper for clamping a disc to a turntable; and a lifting/lowering unit for lifting or lowering the chuck bracket to move the disc to a clamping position where the disc is seated on the turntable in the rotatable state or to a clamping standby position where the disc is separated from the turntable. The lifting/lowering unit includes: first and second protrusion parts formed at the first and second ends of the chuck bracket, respectively; a first slider having a first guide slot part formed to be opposite to the first protrusion part so that the first guide slot part receives and guides the first protrusion part to lift or lower the chuck bracket, where the first slider is mounted to be capable of reciprocating in a predetermined direction and selectively connected to a power transmission unit, which transmits power from a driving motor, at the time of loading or unloading the disc, thereby being reciprocated; a second slider having a second guide slot part formed to be opposite to the second protrusion part so that the second guide slot part receives and guides the second protrusion part to lift or lower the chuck bracket, where the second slider is mounted to be capable of reciprocating in the direction of the reciprocating direction of the first slider; and a connecting member for connecting the second slider with the first slider.

The first and second protrusion parts may each have two protrusion pins and the first and second guide slot parts each have two guide slots. Each of the guide slots may have an ascent slot, a descent slot and a slant slot interconnecting the ascent slot and the descent slot.

The connecting member may include either one of a rod or a bar, of which the opposite ends are connected to the first and second sliders, respectively. Instead of a bar or a rod, the connecting member may include: a shaft rotatably mounted on the main chassis; first and second pinion gears fixed to the opposite ends of the shaft, respectively; and first and second rack gears formed in the first and second sliders, respectively, to be meshed with the first and second pinion gears.

According to another aspect of the present invention, there is also provided a disc player for recording information into or reproducing recorded information from either a first disc having a first size or a second disc having a second size, where the disc player includes: a first slider mounted on a main chassis capable of reciprocating in a first or second disc loading direction and selectively connected to a power transmission unit for transmitting power from a driving motor depending on its moving position, thereby being reciprocated; and a disc chucking apparatus including a chuck bracket having a clamper for clamping a disc to a turntable, and a lifting/lowering unit linked with the first slider to lift or lower the chuck bracket so as to move the first or second disc to a clamping position where the disc is seated on the turntable in the rotatable state or to a clamping standby position where the first or second disc is separated from the turntable, where the lifting/lowering unit includes: a first protrusion part formed at one of the first and second ends of the chuck bracket; and a first guide slot part formed in the first slider opposite to the first protrusion part to receive and guide the first protrusion part so as to lift or lower the chuck bracket.

The lifting/lowering unit may further include: a second protrusion part formed at the other of the first and second ends of the chuck; a second slider having a second guide slot part formed to be opposite to the second protrusion part so that the second guide slot part receives and guides the second protrusion part to lift or lower the chuck bracket, where the second slider is mounted to be capable of reciprocating in the disc loading direction; and a connecting member for connecting the second slider with the first slider.

The first and second protrusion parts may each have two protrusion pins and the first and second guide slot parts may each have two guide slots. Each of the guide slots may have an ascent slot, a descent slot and a slant slot interconnecting the ascent slot and the descent slot.

The connecting member may include either one of a rod and a bar, of which the opposite ends are connected to the first and second sliders, respectively. Instead of a rod or a bar, the connecting member may include: a shaft rotatably mounted on the main chassis; first and second pinion gears fixed to the opposite ends of the shaft, respectively; and first and second rack gears each formed in the first and second sliders, respectively, to be meshed with the first and second pinion gears.

Alternatively, the lifting/lowering unit may further include a hinge axle formed at the other of the first and second ends of the chuck bracket.

BRIEF DESCRIPTION OF THE DRAWINGS

The above aspects and features of the present invention will be more apparent from the description of certain embodiments of the present invention taken with reference to the accompanying drawings, in which.

DETAILED DESCRIPTION OF THE PREFERRED EMBODIMENTS

Figure 1:
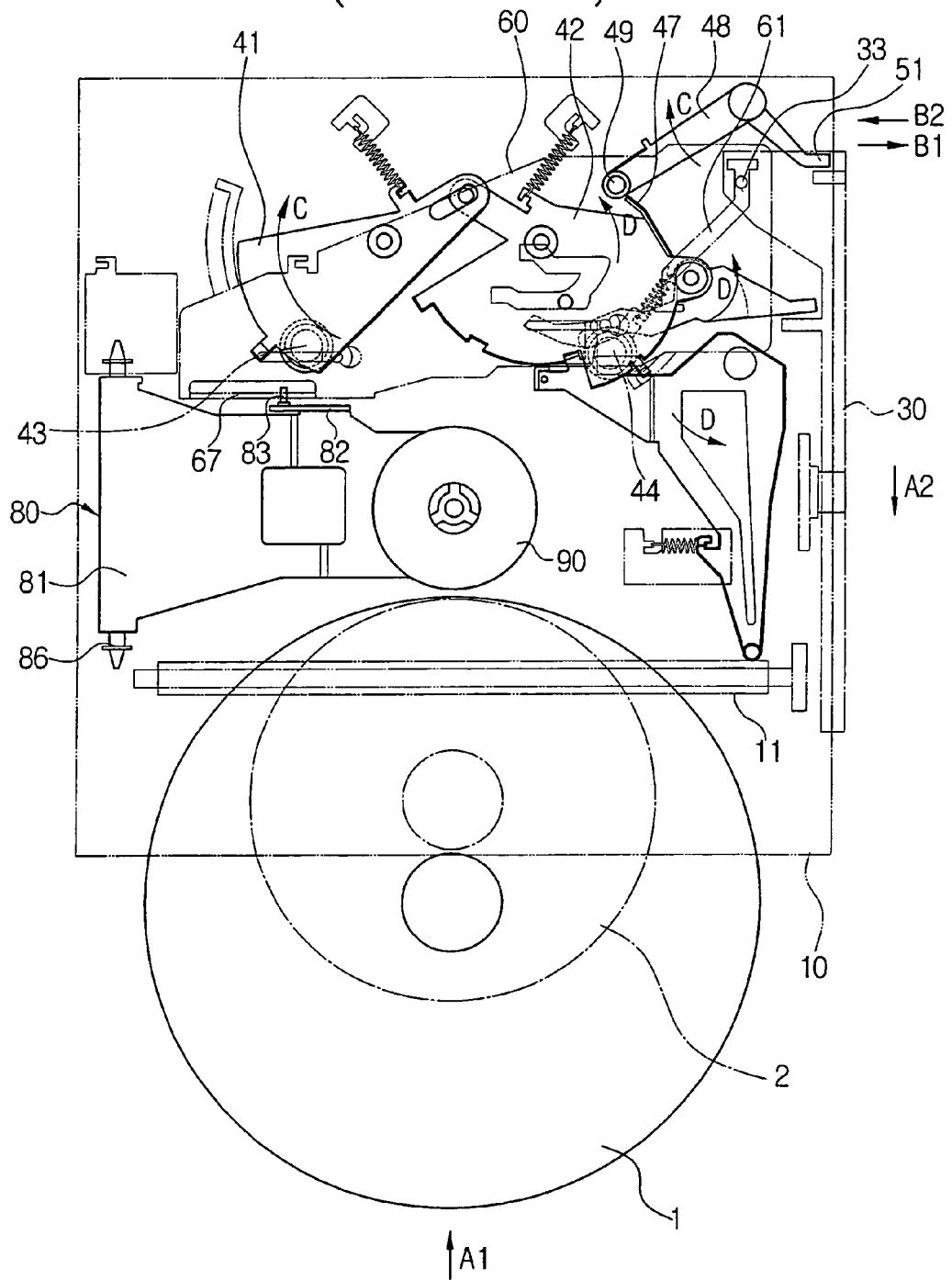
FIG. 1 is a schematic top plan view of a conventional disc player.
Figure 2:
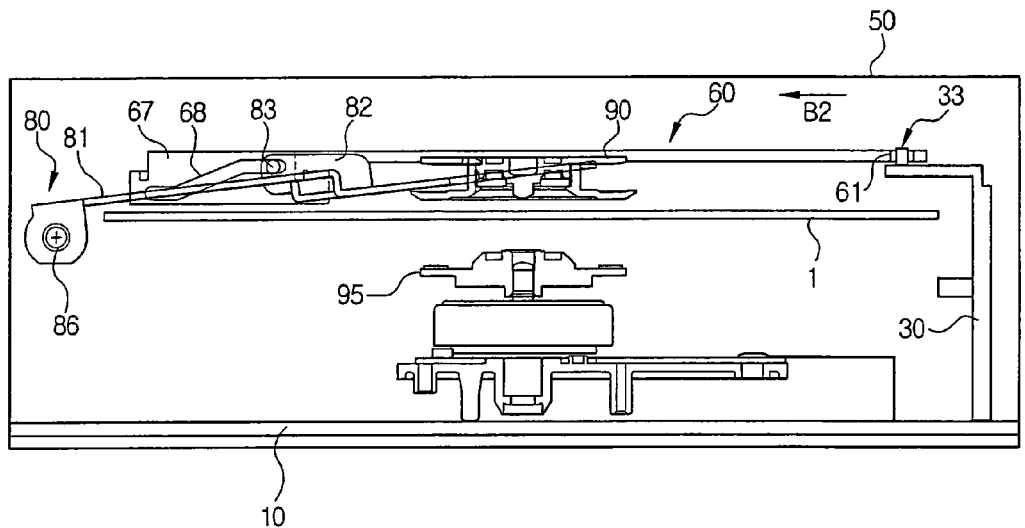
FIG. 2 is a front elevational view of the disc player shown in FIG. 1.
Figure 3:
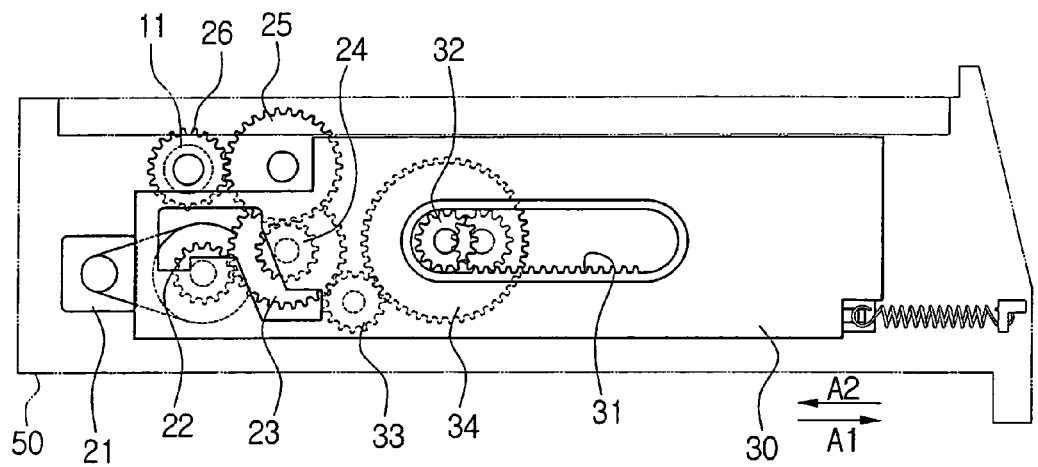
FIG. 3 is a side elevational view of the disc player shown in FIG. 1.
Figure 4:
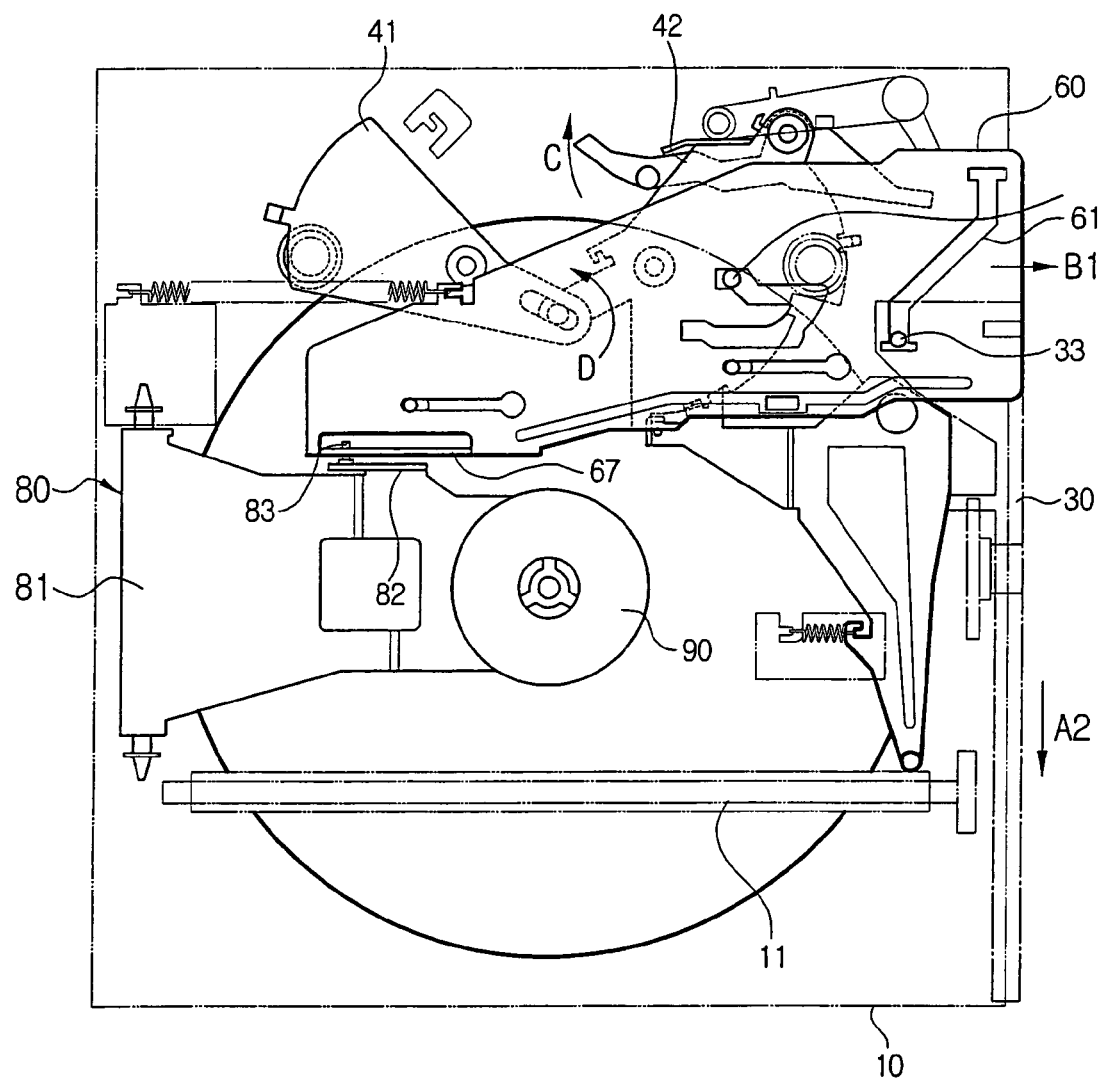
FIGS. 4 and 5 are top plan and front elevational views illustrating the disc chucking operation of the disc player shown in FIG. 1.
Figure 5:
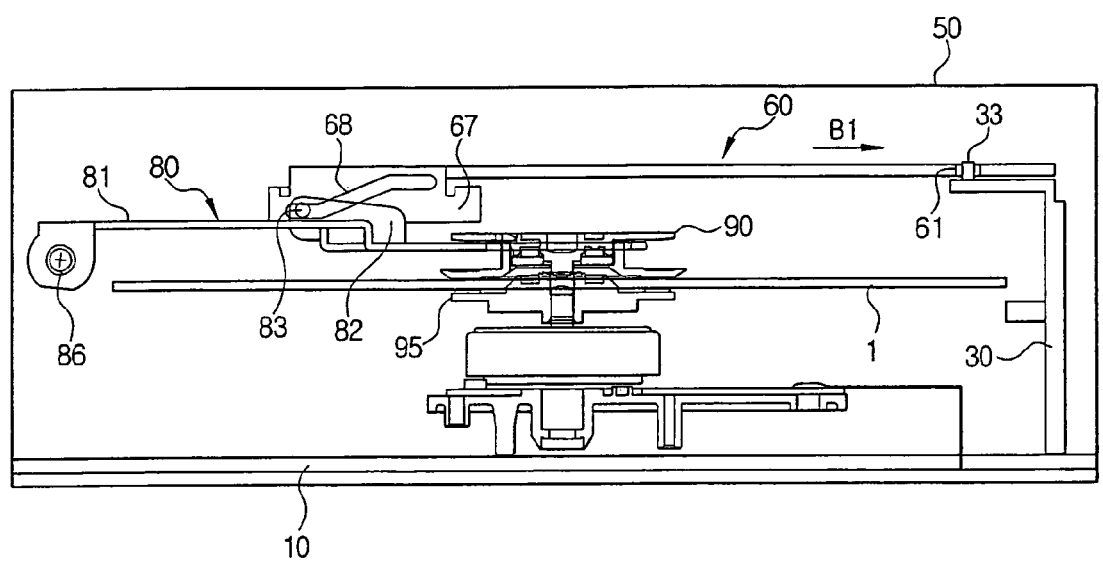

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 6:
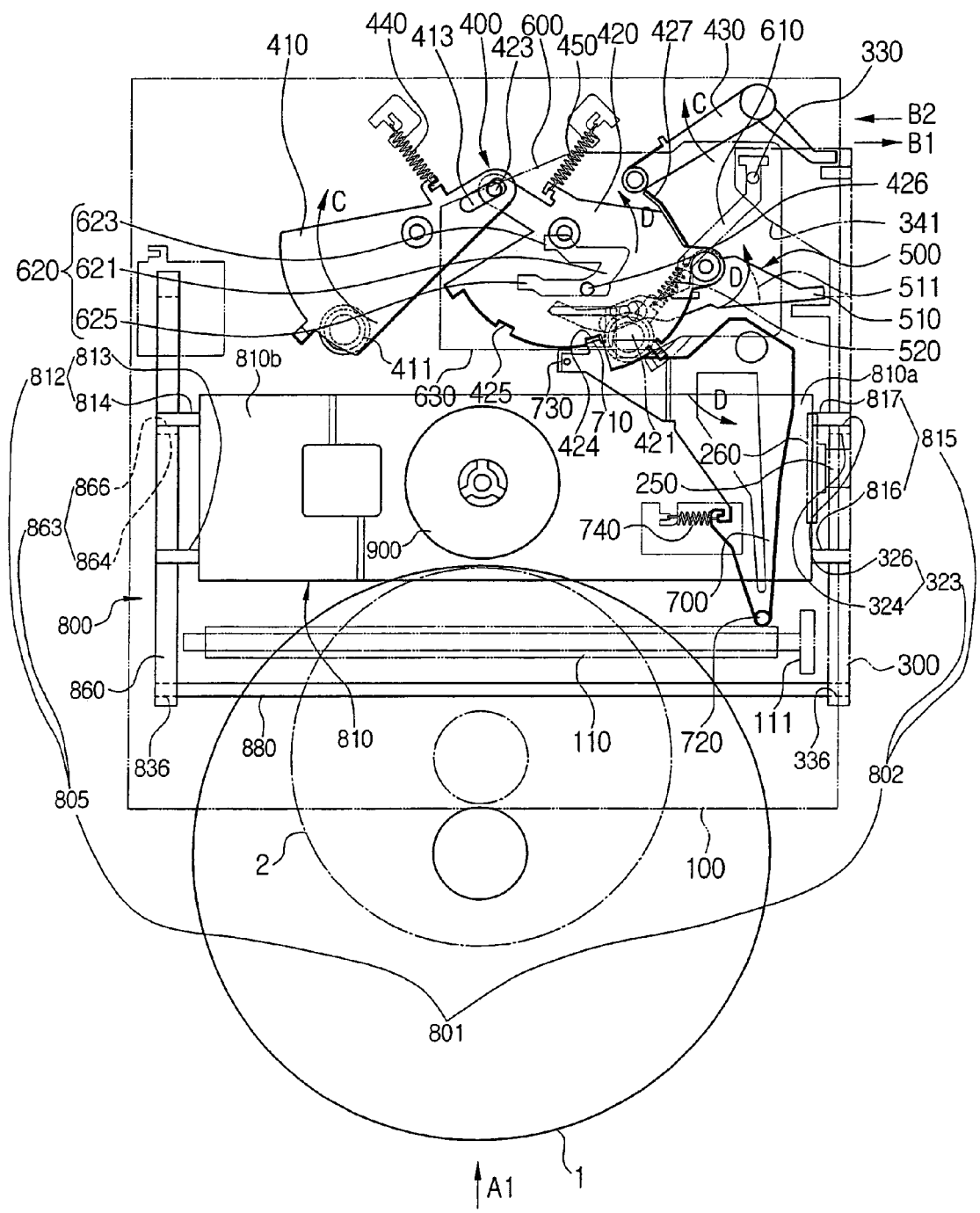
FIG. 6 is a schematic top plan view of a disc player having a disc chucking apparatus according to a preferred embodiment of the present invention.
Figure 7:
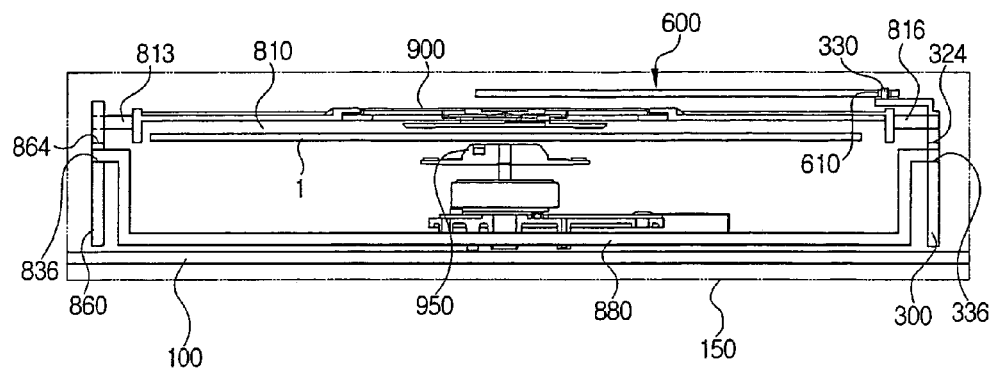
FIG. 7 is a front elevational view of the disc player shown in FIG. 6.
Figure 8:
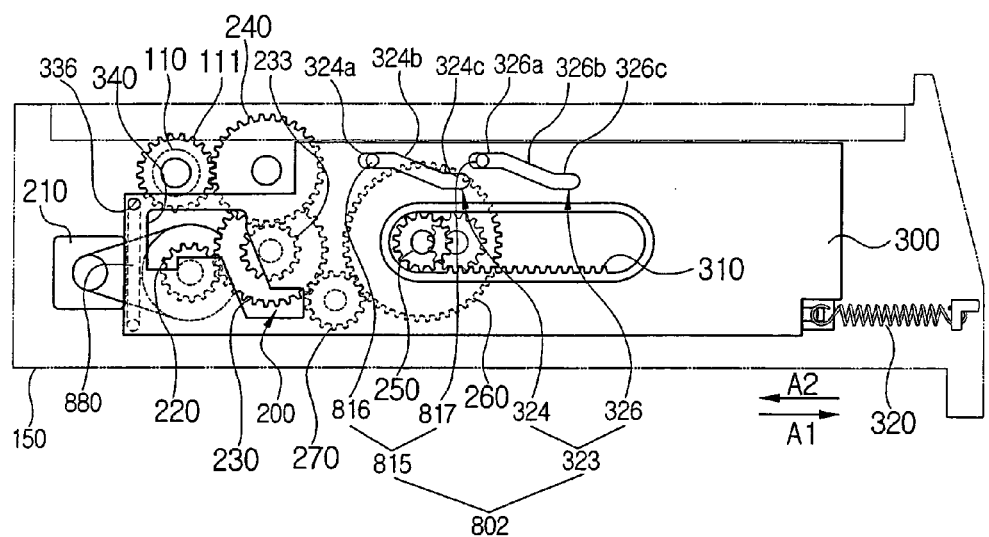
FIG. 8 is a side elevational view of the disc player shown in FIG. 6.

FIGS. 6 to 8 show a disc player having a disc chucking apparatus according to an embodiment of the present invention.

The disc player includes a main chassis 100 with a rotatably mounted transfer roller 110, a power transmission unit 200 for transmitting power of a driving motor 210 to the transfer roller 110, a first slider 300 selectively connected to the power transmission unit 200 and reciprocating, a first linkage mechanism 400 operated when loading a first disc 1, a second linkage mechanism 500 operated when loading a second disc 2, a subordinate chassis 600 reciprocating in connection with the first slider 300, a locking lever for selectively locking or unlocking the first linkage mechanism 400, and a disc chucking apparatus 800 for seating either a first or second disc 1 or 2 on a turntable 950 in a rotatable state or removing the first or second disc from the turntable 950.

The first disc 1 is a conventional 120 mm disc and the second disc 2 is a conventional 80 mm disc. The disc player having the disc chucking apparatus according to the embodiment of the present invention is, for example, a car disc player which can be compatibly loaded with discs of different sizes without any disc tray.

The transfer roller 110 is rotated by receiving power from the power transmission unit 200, thereby transferring a first or second disc 1 or 2 entered into the under side of the main chassis 100, i.e., from the front side of the disc player to the interior of the disc player or discharging the first or second disc 1 or 2 loaded in the interior out of the disc player. Such a transfer roller 110 is supported by a hinge unit (not shown) at its opposite ends. As being pivotally mounted on the main chassis 100 and pivoted in linkage with the first slider 300, the hinge unit can make the transfer roller 110 come into contact with/be spaced from the first or second disc 1 or 2 inserted into/discharged from the disc player.

The main chassis 100 is mounted on the top of a housing 150 provided with an optical pickup (not shown).

The power transmission unit 200 includes a driving motor 210 installed in the housing 150, a plurality of connection gears 220, 230, 240 for transmitting the power of the driving motor 210 to a driven gear 111 connected to the transfer roller 110, a driving gear 250 selectively meshed with a first rack gear 310 provided in the first slider 300, and a main gear 260 coaxially connected to the driving gear 250. A simple connection gear 270 is interposed between the main gear 260 and the connection gear 230. Since the driving motor 210 is bi-directionally rotatable, the driving motor 210 selectively rotates the transfer roller 110 in either direction. Furthermore, the first slider 300 is also capable of forwardly and backwardly moving in the loading direction (i.e., in the A1 and A2 directions).

The first slider 300 is installed on the main chassis 100 to be capable of reciprocating in the loading direction of inserting the first or second disc 1 or 2. The first slider 300 has a first rack gear 310 of a predetermined length. The first rack gear 310 is arranged in such a way that it is separated from the driving gear 250 at its original position, i.e., until the first or second disc 1 or 2 is loaded to the chucking position. In addition, the first slider 300 is elastically biased in the A1 direction by a spring 320. When the first disc 1 is loaded, the first slider 300 is pushed by the first linkage mechanism 400 and connected to the driving gear 250. And, when the second disc 2 is loaded, the first slider 300 is pushed by the second linkage mechanism 500 and connected to the driving gear 250. In addition, the first slider 300 has a cam lug 330 for moving the subordinate chassis 600 in the B1 and B2 directions transverse to the A1 and A2 directions when the first slider 300 moves in the A1 and A2 directions.

The first linkage mechanism 400 is pushed by the first disc 1 when the first disc 1 is inserted into the housing and guides the first disc 1 to the chucking position. In addition, the first linkage mechanism 400 moves the first slider 300 while guiding the first disc 1 to the chucking position, so that the first slider 300 is connected with the power transmission unit 200. The first linkage unit 400 includes a first pivot plate 410 mounted on the main chassis 100 that is capable of rotating over a predetermined range of arc, a second pivot plate 420 mounted on the main chassis 100 that is linked with the first pivot plate 410 and that is capable of rotating over a predetermined range of arc, a first pushing lever 430 linked with the second pivot plate 420 to push the first slider 300 for a predetermined distance in the A1 direction, and first and second springs 440, 450 for elastically biasing the first and second pivot plates 410, 420, respectively, to come into contact with the first disc 1 when being inserted.

The first pivot plate 410 has a first guide roller 411, which comes into contact with the first disc 1 as the first disc 1 is inserted, thereby guiding the first disc 1 to the chucking position. And, the first disc inserted in the A1 direction pushes the first guide roller 411, whereby the first pivot plate 410 pivots in the C direction. An elongate hole 413 is formed at one end of the first pivot plate 410.

Figure 10:
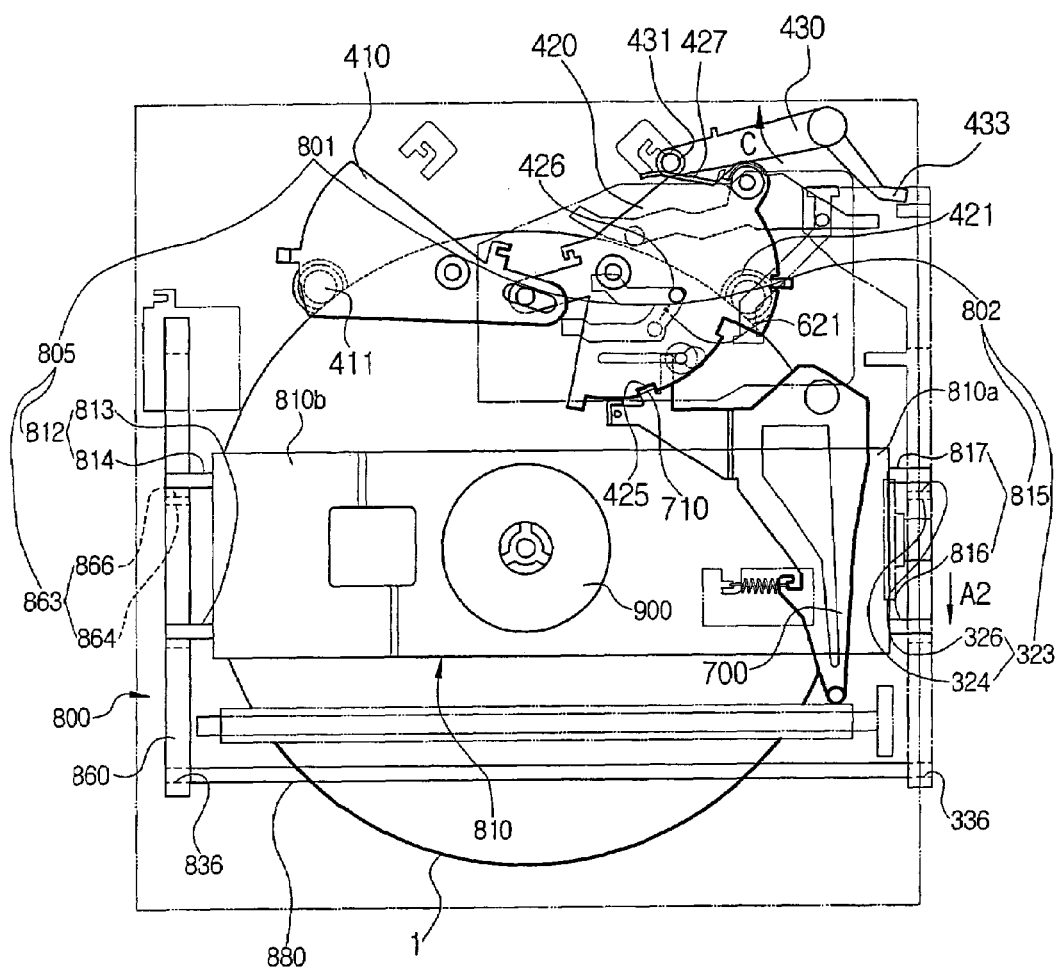

The second pivot plate 420 has a second guide roller 421 which also comes into contact with the first disc 1 as the first disc 1 is being inserted, thereby guiding the first disc 1 to the chucking position, like the first guide roller 411. In addition, the second pivot plate 420 has a pin 423 inserted into the elongate hole 413 so that the second pivot plate 420 is linked to the first pivot plate 410. Furthermore, the second pivot plate 420 has a first locking groove 424 formed on the edge of the second pivot plate 420 to be engaged with the locking lug 710 of the locking lever 700 at the original position when the first disc 1 has not been inserted (in the state shown in FIG. 6). The second pivot plate 420 is also formed with a second locking groove 425 spaced from the first locking groove 424 by a predetermined distance. In the state in which the second pivot plate 420 has been additionally pivoted by the first disc 1 as the first disc 1 is inserted, the locking lug 710 is engaged again with the second locking groove 425 as shown in FIG. 10. If the second pivot plate 420 is located at a 'middle position' in this manner, the first disc 1 is laid on the chucking position and the first and second guide rollers 411, 421 are respectively in contact with the first disc 1.

In addition, a guide pin 426 is projectedly formed on the top surface of the second pivot plate 420. The guide pin 426 is guided by the movement of the subordinate chassis 600 and additionally pivots the second pivot plate 420 in the D direction from the 'middle position.' As such, the first pivot plate 410 is also linked to the second pivot plate 420 and additionally pivoted in the C direction, and the first and second guide rollers 411, 421 can be separated from the first disc 1. Furthermore, the second pivot plate 420 has a contact part 427 formed by bending a part of the edge of the second pivot plate 420 downwardly. When the second pivot plate 420 is additionally rotated in the D direction from its original position to the 'middle position,' i.e., to the position shown in FIG. 10, the contact part 427 pushes one end of the first pushing lever 430, thereby rotating the first pushing lever 430 in the C direction. Accordingly, the other end 433 of the first pushing lever 430 pushes the first slider 300 in the A1 direction while the first pushing lever 430 is being rotated in the C direction, whereby the first rack gear 310 and the driving gear 250 are engaged with each other.

Meanwhile, the first and second springs 440, 450 are respectively connected to the main chassis 100 and elastically bias the first and second pivot plates 410, 420 toward their 'original positions,' respectively.

The second linkage mechanism 500 is pushed and moved by the second disc 2 as the second disc is inserted and connects the first slider 300 to the power transmission unit 200. The second linkage mechanism 500 includes a second pushing lever 510 rotatably mounted on the second pivot plate 420, and a spring 520 for elastically biasing the second pushing lever 510 in the D direction. One end of the second pushing lever 510 is pushed and rotated by the second disc 2 as the second disc 2 is inserted into the chucking position while the other end of the second pushing lever 510 pushes the first slider 300 in the A1 direction. That is, because the first pushing lever 430 is immovable when the second disc 2 is inserted, the second pushing lever 510 pushes the first slider 300 while the second pushing lever 510 is being pushed by the second disc 2, whereby the first rack gear 310 and the driving gear 250 are engaged with each other. The spring 520 is connected to the second pivot plate 420 at one end and connected to the second pushing lever 510 at the other end. Thus, the spring 520 elastically biases the pushing lever so that the second pushing lever 510 comes into contact with the second disc 2, while the spring 520 moves along with the second pivot plate 420.

Figure 12:
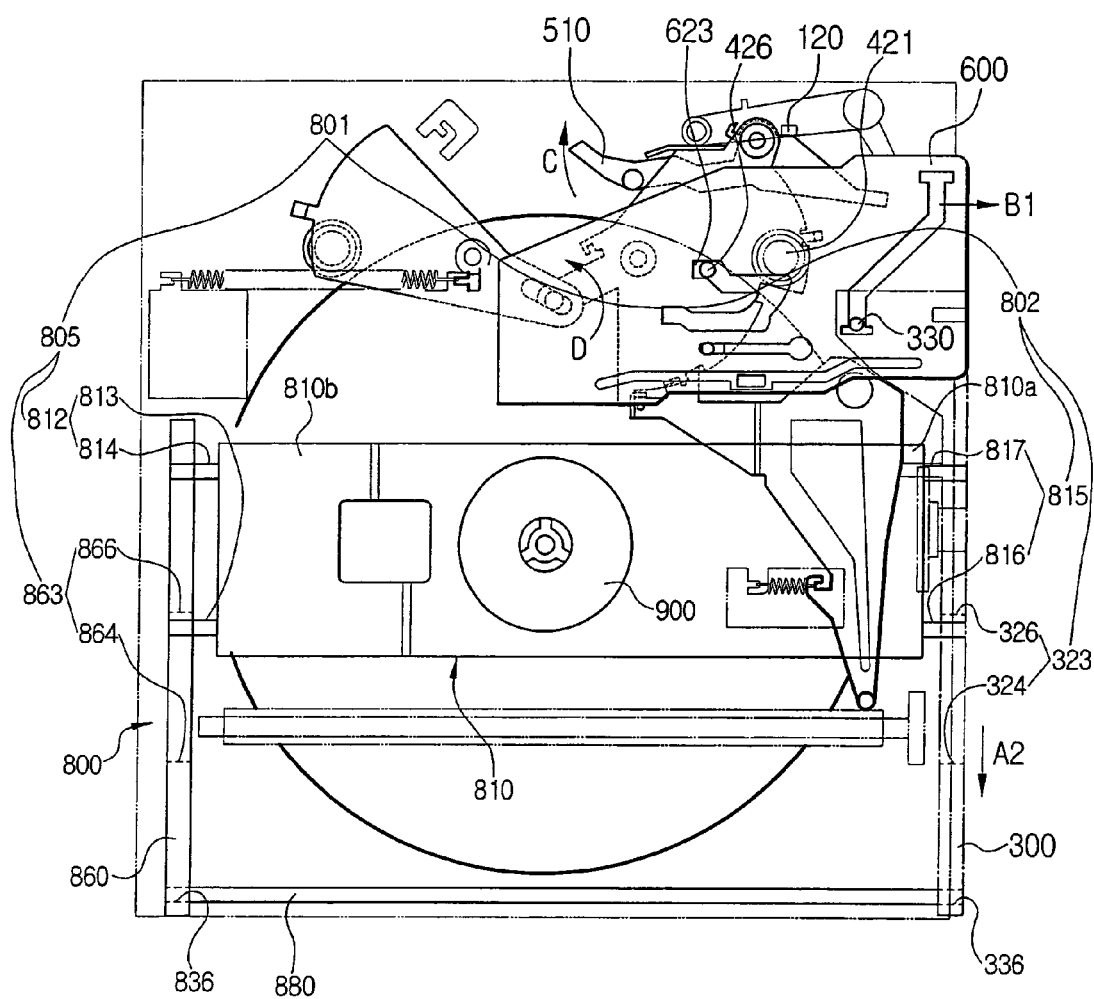

When the first disc 1 is inserted, the second pushing lever 510 is moved in the D direction along with the second pivot plate 420 in the state of being in contact with the first disc 1. Then, when the second pivot plate 420 is fully rotated in the D direction and thus the first guide roller 421 is separated from the first disc 1 as shown in FIG. 12, the first pushing lever 510 comes into contact with the projection part 120 projectedly formed on the main chassis 100 and rotates in the C direction, thereby being separated from the first disc 1.

When the second disc 2 is inserted, the pushing lever 510 is pushed by the second disc 2 at one end, thereby pushing the first slider 300 in the A1 direction. In addition, while the first slider 300 is continuously moved in the A1 direction, a projection part 341 laterally extending from the first slider 300 pushes the cam part 511 of the second pushing lever 510, whereby the second pushing lever 510 is separated from the second disc 2.

The subordinate chassis 600 is mounted on the top of the main chassis 100 to be capable of reciprocating in the B1 and B2 directions. The subordinate chassis 600 reciprocates in linkage with the first slider 300 and moves the first linkage mechanism 400, thereby causing the first linkage mechanism 400 to be separated from the first disc 1 or the second disc 2 located at the chucking position. The subordinate chassis 600 has a sliding cam slit 610 and the cam lug 330 of the first slider 300 is engaged into the sliding cam slit 610. When the first slider 300 moves in the A1 and A2 directions, the cam slit 610 is drawn and guided by the cam lug 330 and thus the subordinate chassis 600 moves. The subordinate chassis 600 also has a separating cam slit 620, into which the guide pin 426 of the second pivot plate 420 is engaged.

The separating cam slit 620 serves to guide the movement of the guide pin 426 so as to separate the first linkage mechanism 400, that is, the first and second guide rollers 411, 421 from either the first disc 1 or the second disc 2. The separating cam slit 620 is formed in a two-step shape. That is, the separating cam slit 620 has an arc-shaped main slit 621 for guiding the movement of the guide pin 426 when the first disc 1 is inserted and moved to the chucking position, a first slit 623 extending from the top end of the main slit 621, and a second slit 625 extending from the lower end of the main slit 621. The first slit 623 and the second slit 625 are symmetrically formed. The first slit 623 serves to separate the first and second guide rollers 411, 421 from the first disc 1 located at the chucking position. Therefore, if the guide pin 426 is moved upward along the main slit 621 from its original position shown in FIG. 6 and then the subordinate chassis 600 is moved in the B1 direction when the first disc 1 is inserted, the guide pin 426 is additionally moved upward by the stepped part of the first slit 623, whereby the first and second guide rollers 411, 421 can be separated from the first disc 1. The second slit 625 serves to guide the movement of the guide pin 426 so as to separate the first linkage mechanism from the second disc 2 located at the chucking position. That is, if the second disc 2 which is smaller than the first disc 1 is inserted, the first and second guide rollers 411, 421 come into contact with the second disc 2 at their original positions. Therefore, the guide pin 426 also stays at its original position as shown in FIG. 6. If the subordinate chassis 600 moves in the B1 direction from this state, the guide pin 426 rotates the second pivot plate 420 in the D direction while being guided by the stepped part of the second slit 625, whereby the first pivot plate 410 is rotated in linkage with the second pivot plate 420. Then, the first and second guide rollers 411, 421 are separated from the second disc 2.

By being rotated in linkage with the first disc 1 when inserted or when the subordinate chassis 600 moves in the B1 direction, the locking lever 700 selectively locks or unlocks the movement of the first linkage mechanism 400. The locking lever 700 is pivotally installed on the main chassis 100 and includes a spring 740 for elastically biasing the locking lever 700. One end of the locking lever 700 is provided with an interference pin 720, which comes into with the first disc 1 as the first disc 1 is inserted. The other end of the locking lever 700 is provided with a locking lug 710 engaged with each of the first and second locking grooves 424, 425. In addition, the locking lever 700 has a guide projection 730 upwardly projected adjacent to the locking lug 710. When the subordinate chassis 600 moves in the B1 direction, the guide projection 730 is contacted with and pushed by the lower edge 630 of the subordinate chassis 600, whereby the locking lever 700 is rotated in the D direction, so that the locking lug 710 can be released from the first or second locking groove 424, 425.

The disc chucking apparatus 800 includes a chuck bracket 810 and a lifting/lowering unit 801.

The chuck bracket 810 is formed from a rectangular plate and a clamper 900 for clamping a first or second disc 1 or 2 to the turntable 950 mounted on the main chassis 100 is provided at the center of the chuck bracket 810. The clamper 900 seats the first or second disc 1 or 2 on the turntable 950 in the rotatable state when the chuck bracket 810 is positioned at a clamping position (see FIG. 13) with the help of the lifting/lowering unit 801. The construction of the clamper 900 is well known in the art and thus detailed description thereof is omitted.

The lifting lowering unit 801 is divided in to a first part 802 acting on the first slider 300 and a second part 805 acting on the second slider 860. The lifting/lowering unit 801 lifts and moves the chuck bracket 810 to a clamping position (see FIG. 13), where the first or second disc 1 or 2 transferred to the chucking position is seated on the turntable 950 in the rotatable state or to a clamping standby position (see FIG. 7), where the first or second disc 1 or 2 is separated from the turntable 950.

The lifting/lowering unit 801 includes: first and second protrusion parts 815, 812 formed at the first and second ends 810a, 810b of the chuck bracket 810, respectively; first guide slot part 323 formed in the first slider 300 to be opposite to the first protrusion part 815, so that the first guide slot part 323 receives and guides the first protrusion part 815 to lift or lower the first end 810a; a second slider 860 having a second guide slot part 863 formed to be opposite to the second protrusion 812, so that the second guide slot part 863 receives and guides the second protrusion part 812 to lift or lower the second end 810b of the chuck bracket 810; and a connecting member 880 for connecting the second slider 860 with the first slider 300.

The first and second protrusion parts 815, 812 each include two protrusion pins 816, 817; 813, 814 and the first and second guide slot parts 323, 863 each include two guide slots 324, 326; 864, 866.

The guide slots 324, 326 of the first guide slot part 323 are the same as the guide slots 864, 866 of the second guide slot part 323 in arrangement and shape.

Figure 14:
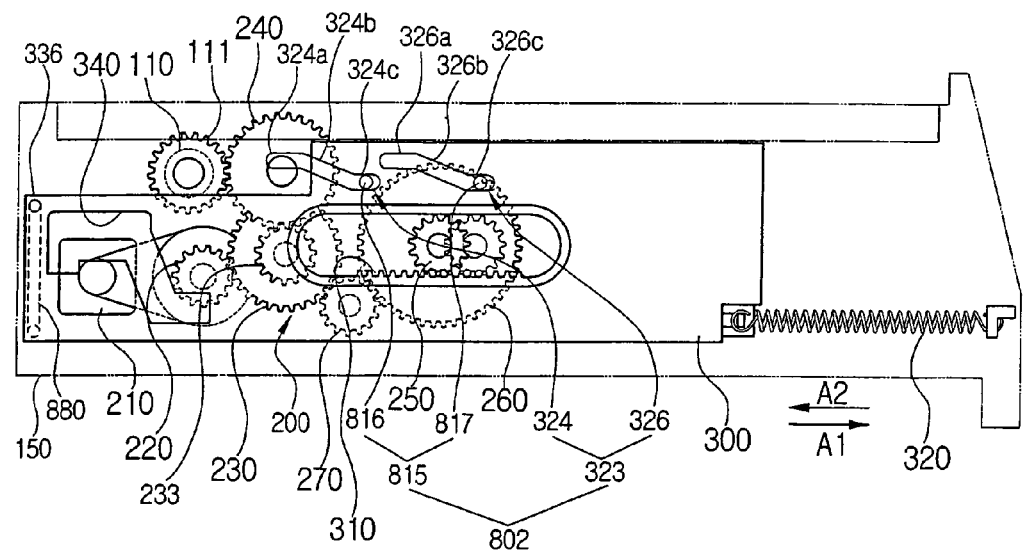

As shown in FIGS. 8 and 14, each guide slot 324; 326; 864; 866 has an ascent slot 324a; 326a (only the guide slots 324, 326 of the first guide slot part 323 are shown), a descent slot 324c; 326c, and a slant slot 324b; 324b for interconnecting the ascent slot 324a; 326a and the descent slot 324c; 326c.

The second slider 860 is mounted on the main chassis 100 to be capable of reciprocating in the loading direction of the first or second disc 1 or 2, like the first slider 300.

The connecting member 880 is formed from a square shaped rod or bar and has opposite ends immovably fixed in the first fixing hole 836 of the second slider 860 and the second fixing hole 336 of the first slider 300, respectively.

Figure 19:
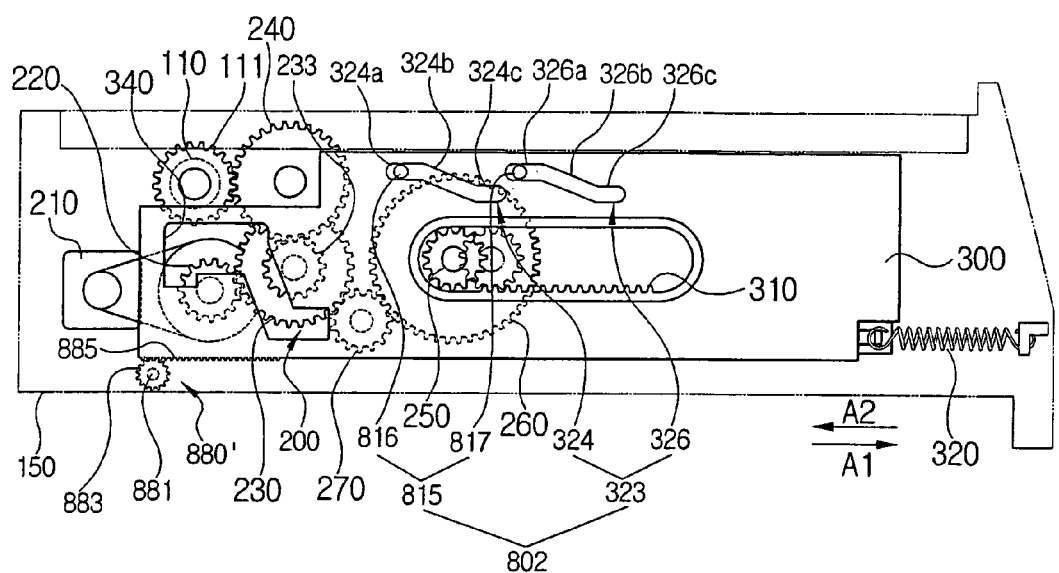
FIG. 19 is a side elevational view exemplifying a variant embodiment of a connecting member of a lifting/lowering unit of a disc chucking apparatus of the disc player shown in FIG. 6.

Alternatively, as shown in FIG. 19, the connecting member 880' may include a shaft 881 pivotally installed on the main chassis 100, first and second pinion gears 883 (only one is shown) fixed at the opposite ends of the shaft 331, respectively, and second and third rack gears 885 (only the rack gear of the first slider 300 is shown) formed in the first and second sliders 300, 860 to be meshed with the first and second pinion gears 883, respectively.

Accordingly, when the first slider 300 is moved in the A2 direction by the first rack gear 310 and the driving gear 250 after a first or second disc 1 or 2 has been loaded into the chucking position, the second slider 860 is moved in the A2 direction along with the first slider 300 by the connecting member 800 or 800'. As such, the first and second protrusion parts 815, 812 are moved to the descent slots 324c, 326c of the first and second guide slot parts 323, 863 and then lowered, and the chuck bracket 810 is lowered and positioned at the clamping position. As a result, the clamper 900 seats the first or second disc 1 or 2 on the turntable 950 in the rotatable state.

To the contrary, when the first slider 300 is moved in the A1 direction by the first rack gear 310 and the driving gear 250, the second slider 860 is moved in the A1 direction along with the first slider 300 by the connecting member 880 or 880'. As such, the first and second protrusion parts 815, 812 are moved to the ascent slots 324a, 326a of the first and second guide slot parts 323, 863 and then lifted, and the chuck bracket 810 is lifted and positioned at the clamping standby position. As a result, the clamper 900 is separated from the turntable 950 and releases the first or second disc 1 or 2.

In the above-mentioned disc player according to the present invention, although it has been described and exemplified that the lifting/lowering unit 801 of the disc chucking apparatus 800 includes the second protrusion part 812 formed at the second end 810b of the chuck bracket 810, the second slider 860 having the second guide slot part 863, and the connecting member 880 for connecting the second slider 860 with the first slider 300, in order to raise/lower not only the first end 810a but also the second end 810b of the chuck bracket 810, the present invention is not limited to this. It should be understood that the lifting/lowering unit 801 can be configured in such a manner that only the first end 810a of the chuck bracket 810 can be lifted and lowered. In that event, the first end 810a of the chuck bracket 810 may be lifted or lowered by the first protrusion part 815 and the first guide slot part 323 formed in the first slider 810 to be opposite to the first protrusion part 815, and the second end 810b of the chuck bracket 810 may be arranged to be pivotal up and down about the hinge axle 86, like the disc chucking apparatus 80 described above with reference to FIG. 1.

In addition, the lifting/lowering unit 801 of the disc chucking apparatus 800 can be applied to a disc player having a disc tray with the same principle and construction instead of being applied to a car disc player with no disc tray exemplified and described in the above embodiment.

Now, the disc loading operation of the disc player having the inventive disc chucking apparatus 800 is described in detail.

At first, the operations of loading a 120 mm disc, i.e., the first disc 1 is described.

As shown in FIG. 6, if the first disc 1 is inserted into the housing 150 in the loading direction, i.e., in the A1 direction, the controller (not shown) drives the driving motor 210 (see FIG. 8) according to a signal from a disc detection sensor for detecting the entry of the first disc 1. Then, the first disc 1 is drawn into the housing 150 by the rotation of the transfer roller 110 receiving power from the driving motor 210 through the plurality of connection gears 220, 230, 233, 240, and the driven gear 111.

Figure 9:
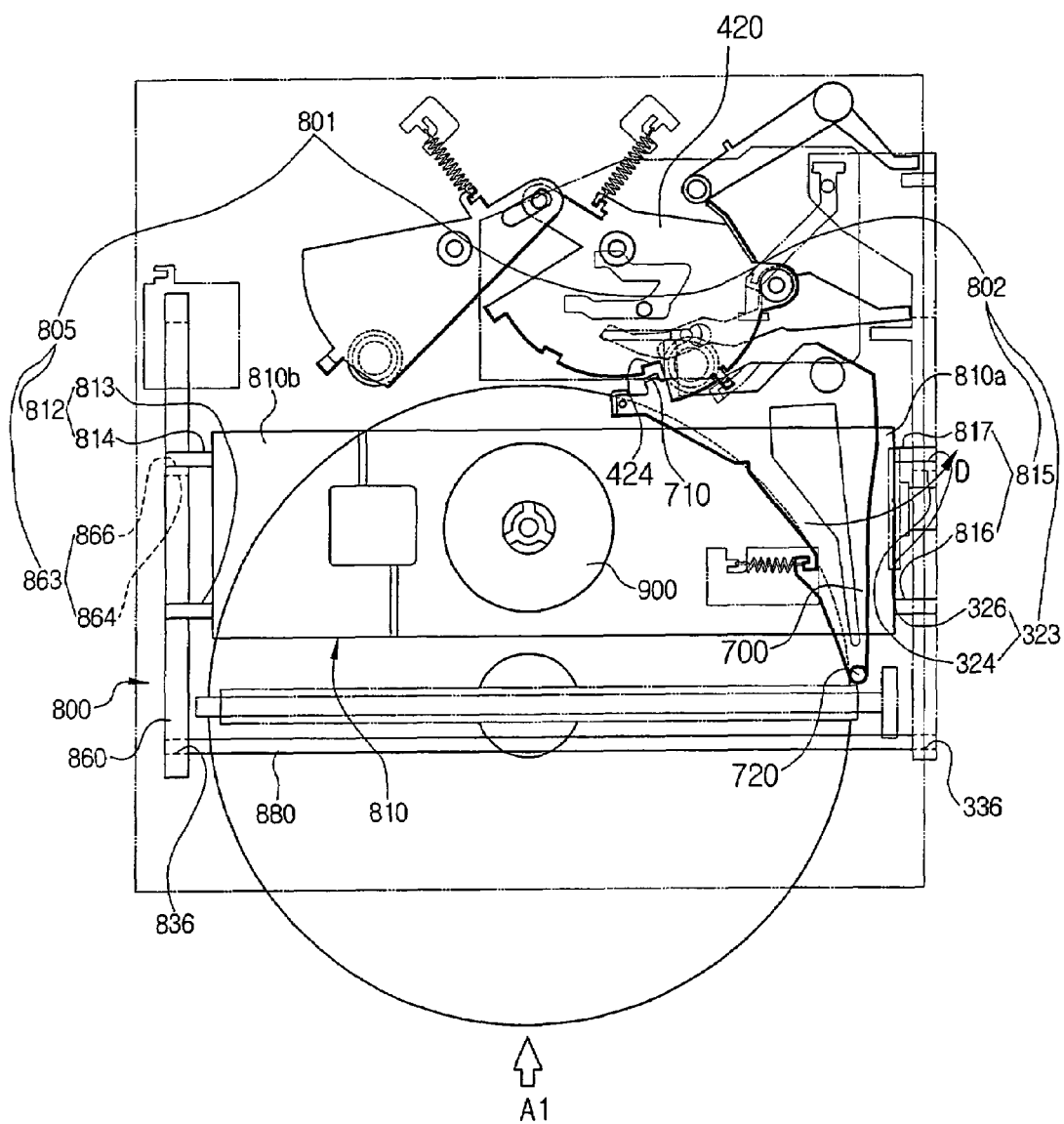
FIGS. 9 to 14 are schematic views illustrating the operations for loading a 120 mm disc into the disc player shown in FIG. 6.

Referring to FIG. 9, the first disc 1 comes into contact with the interference pin 720 of the locking lever 700 and rotates the locking lever 700 in the D direction while the first disc 1 is inserted. Then, the locking lug 710 of the locking lever 700 is separated from the first locking groove 424 of the second pivot plate 420. If the first disc 1 is additionally inserted from this state, the first disc 1 moves to the chucking position while pushing the first and second guide rollers 411, 421, as shown in FIG. 10. Thus, the first and second pivot plates 410, 410 are rotated in the opposite directions from one another and the guide pin 426 is upwardly moved along the main slit 621. In addition, the contact part 427 of the second pivot plate 420 pushes one end 431 of the first pushing lever 430. Then, the other end 433 of the first pushing lever 430 pushes the first slider 300 for a predetermined distance in the A2 direction while the first pushing lever 430 is rotated in the C direction.

Further, the locking lever 700 is returned to its original position, and the locking lug 710 is locked to the second locking groove 425 of the second pivot plate 420. Thus, the first and second guide rollers 411, 421 are fixed in position in the state of being in contact with the first disc 1.

Figure 11:
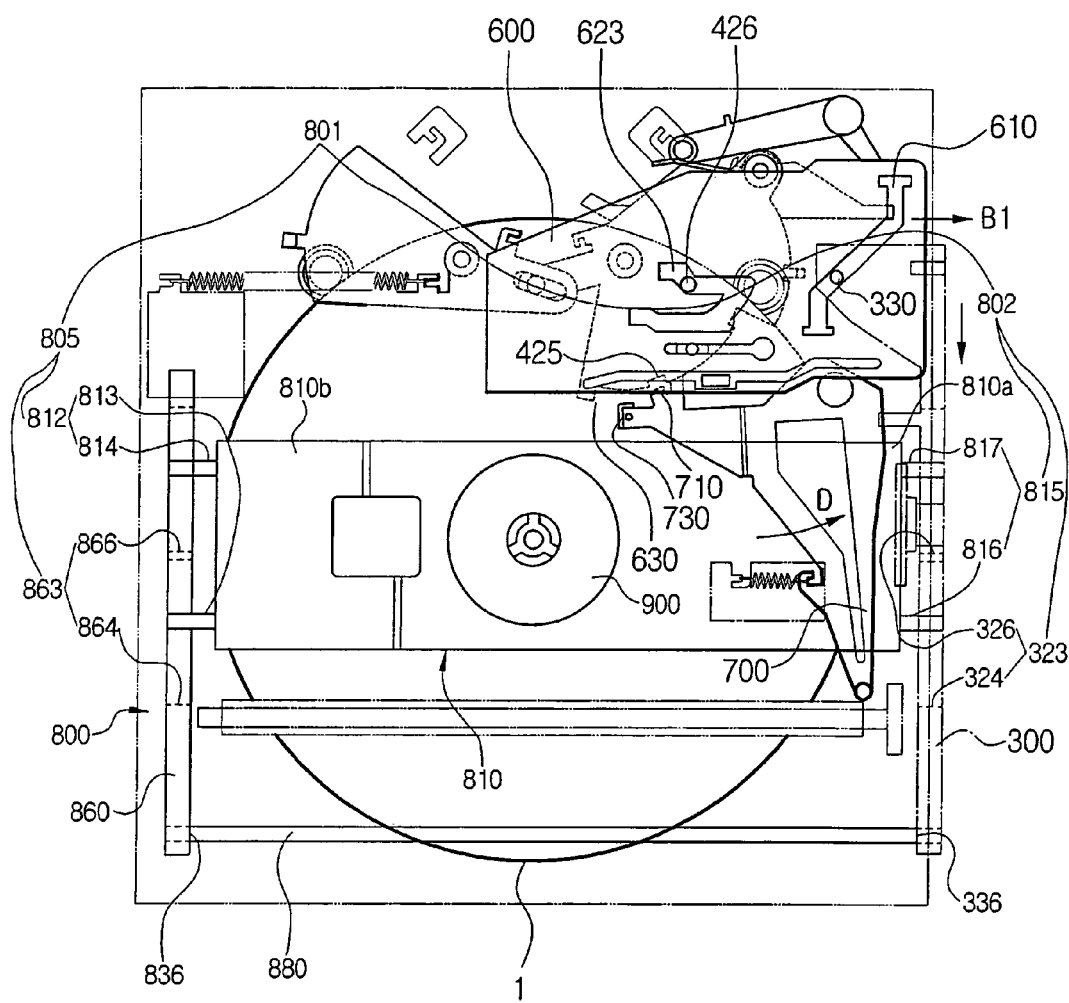

Next, if the first slider 300 is pushed for a predetermined distance in the A2 direction, the first rack gear 310 is meshed with the driving gear 250 as shown in FIG. 8. Then, the power of the driving gear 250 is transmitted to the first rack gear 310, and the first slider 300 is continuously moved in the A2 direction. Then, as shown in FIG. 11, the cam slit 610 of the subordinate chassis 600 is guided by the movement of the cam lug 330 and the subordinate chassis 600 is moved in the B1 direction. When the subordinate chassis 600 is moved in the B1 direction, the guide pin 426 is inserted into the first slit 623. Then, the lower edge 630 of the subordinate chassis 600 pushes the guide lug 730 of the locking lever 700, thereby rotating the locking lever 700 in the D direction. Thus, the locking lug 710 is separated from the second locking groove 425 and unlocked. From this state, if the first slider 300 is additionally moved in the A2 direction, the subordinate chassis 600 is pulled by the cam lug 330 and fully moved in the B1 direction. Then, the guide pin 426 additionally rotates the second pivot plate 420 in the D direction while being guided in the first slit 623, whereby the first and second guide rollers 411, 421 are separated from the first disc 1.

In addition, when the second pivot plate 420 is additionally pivoted in a predetermined range of arc by the first slit 623, one end of the second pushing lever 510 is contacted with and supported by the projection part 341 projected downwardly at a predetermined position of the main chassis 100. Accordingly, the second pushing lever 510 is rotated by a predetermined range of arc in the C direction and separated from the first disc 1.

Figure 13:
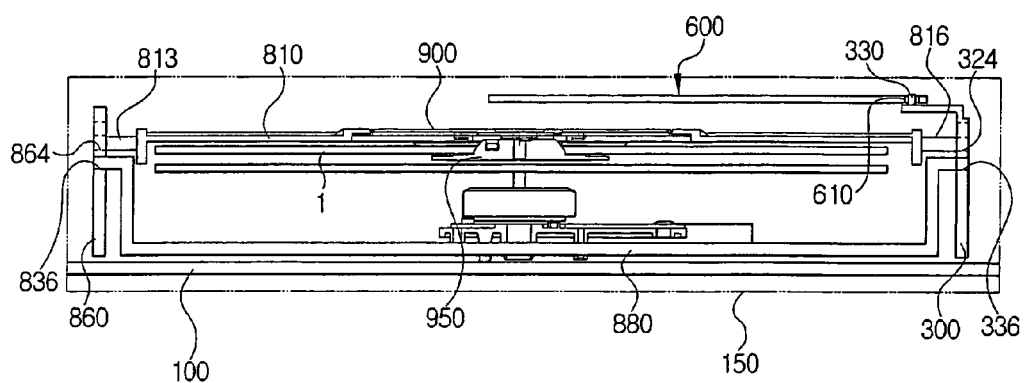

Furthermore, as the first slider 300 moves in the A2 direction, the second slider 860 is moved along with the first slider 300 in the A2 direction by the connecting member 880. Consequently, as shown in FIG. 14, the first and second protrusion parts 812, 815 are moved to the descent slots 324c, 326c of the first and second guide slot parts 323, 863 and then lowered, and the chuck bracket 810 is lowered and positioned at the clamping position. As a result, the clamper 900 seats the first disc 1 on the turntable 950 in the rotatable state, as shown in FIG. 13.

If the respective guide rollers 411, 421 and the second pushing lever 510 are separated from the first disc 1 and the first disc 1 is in the state of being rotatable on the turntable 950, the loading operation of the first disc 1 is finished.

As the hinge unit (not shown) of the transfer roller 110 is guided and pivoted by the cam slot 340 formed in the first slider 300, the transfer roller 110 is lowered and separated from the first disc 1.

From this state, the first disc 1 is rotated on the turntable 950 and an optical pickup (not shown) records information into or reproduces recorded information from the disc 1.

Now, the unloading operation of the first disc 1 after information is recorded into or reproduced from the first disc 1 is described.

At first, the driving motor 210 is reversely rotated to return the slider 300 in the A1 direction. Then, the subordinate chassis 600 is also returned in the B2 direction (see FIG. 7). As a result, the disc chucking apparatus 800 operates in the reversed sequence with reference to the operation of loading the first disc 1. As such, the first disc 1 is separated from the turntable 950 and at the same time comes into contact with transfer roller 110, and then the first disc 1 is discharged out of the housing 150 by the transfer roller 110.

Next, the loading operation of a second disc 2, i.e., an 80 mm disc, which is smaller than the first disc 1, is described.

Figure 15:
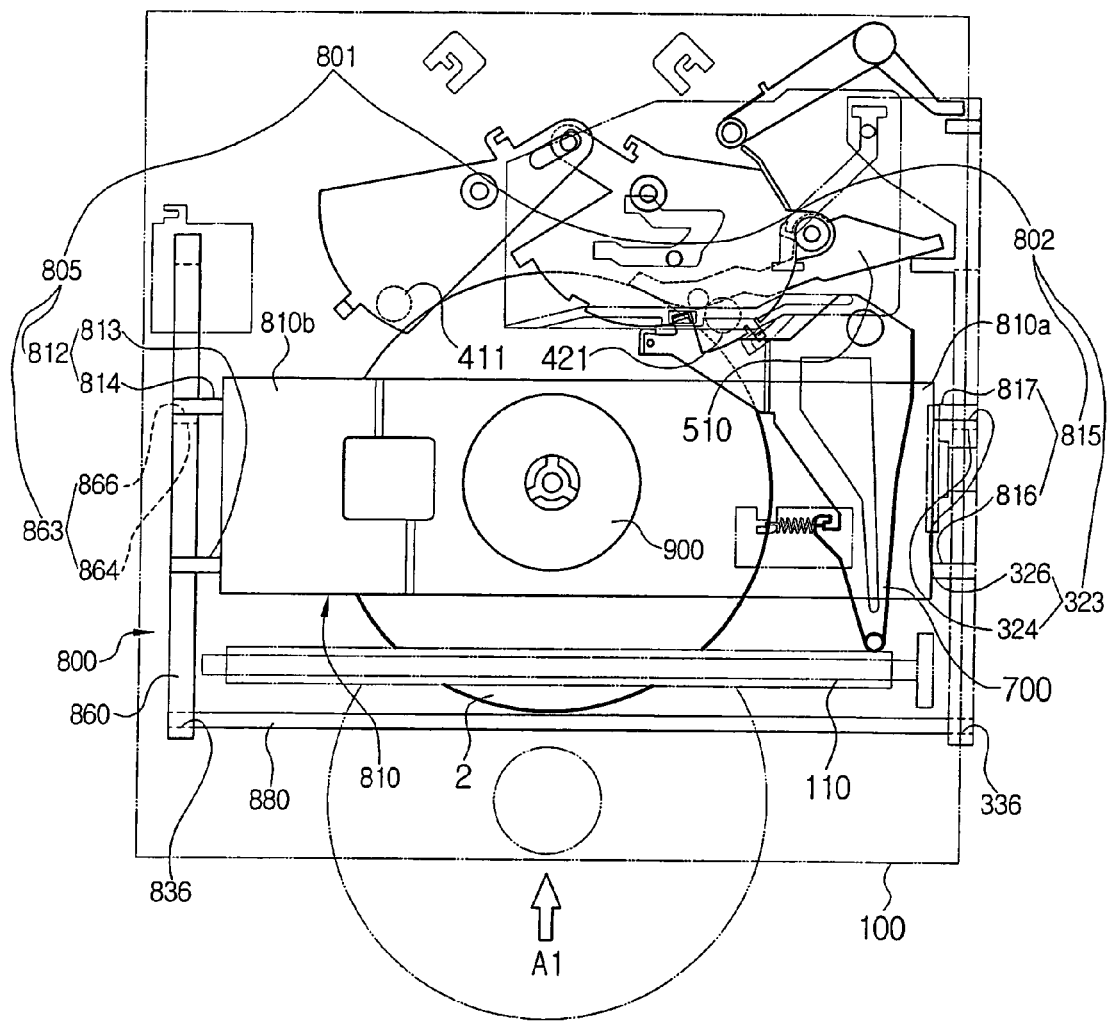
FIGS. 15 to 18 are schematic views illustrating the operations for loading an 80 mm disc into the disc player shown in FIG. 6.
Figure 16:
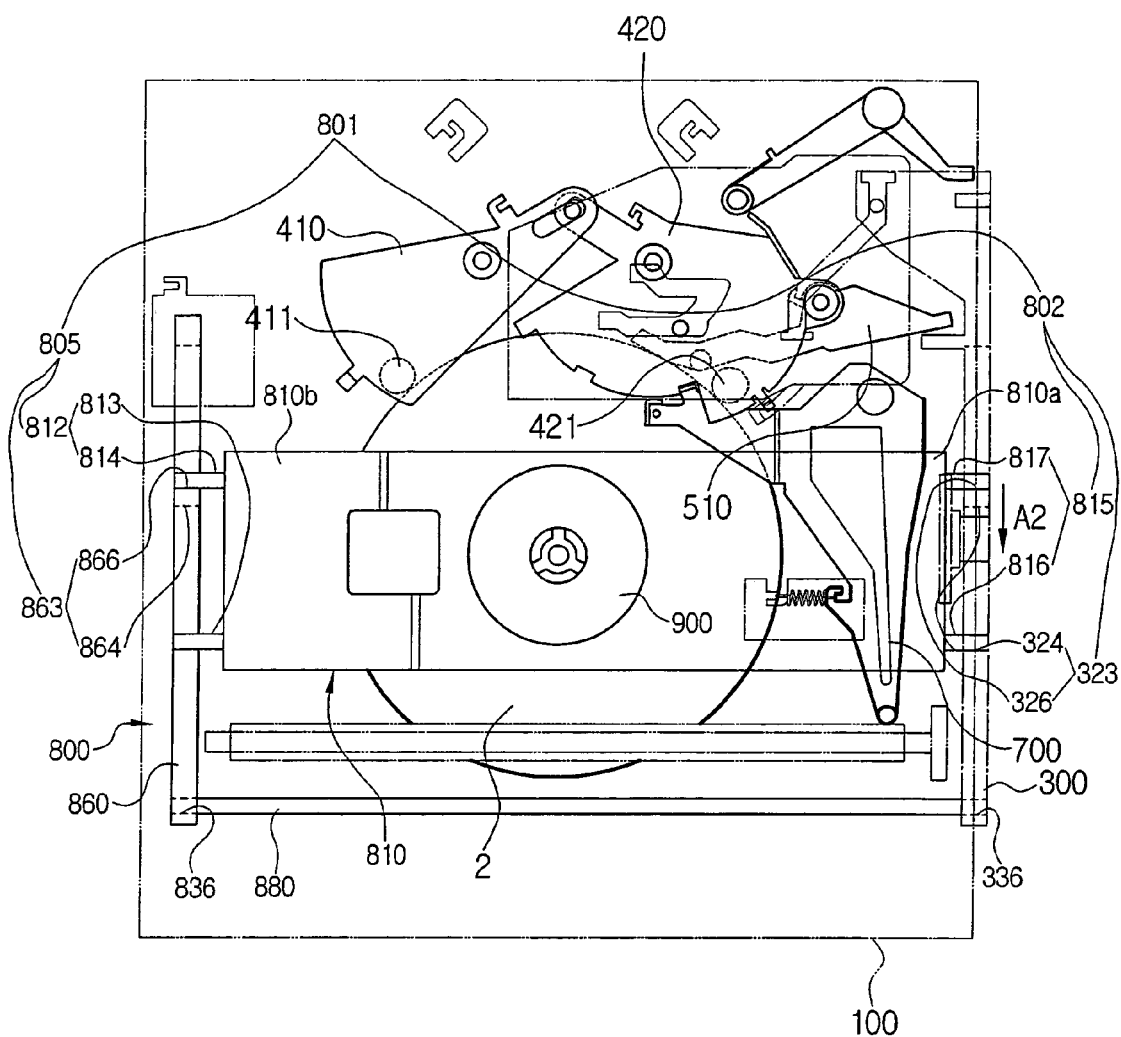
Figure 17:
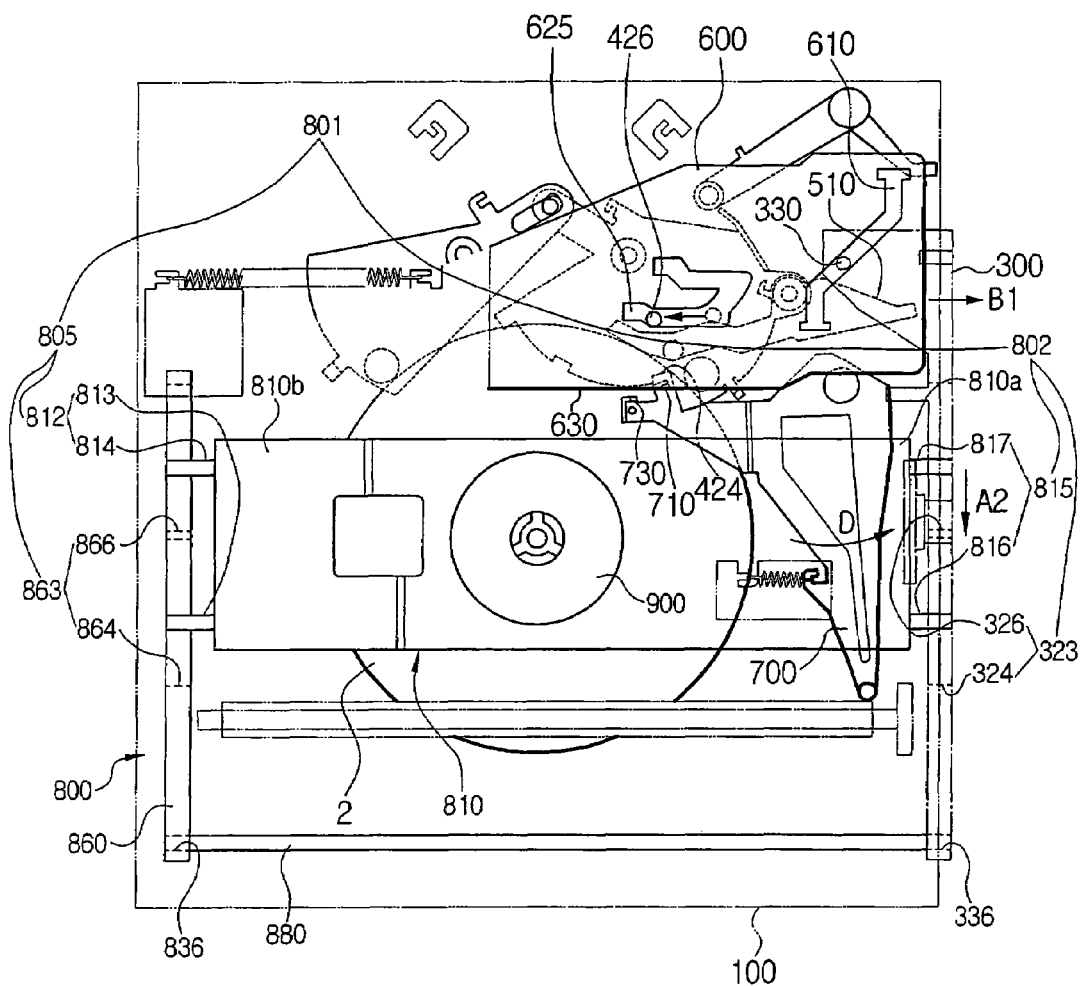
Figure 18:
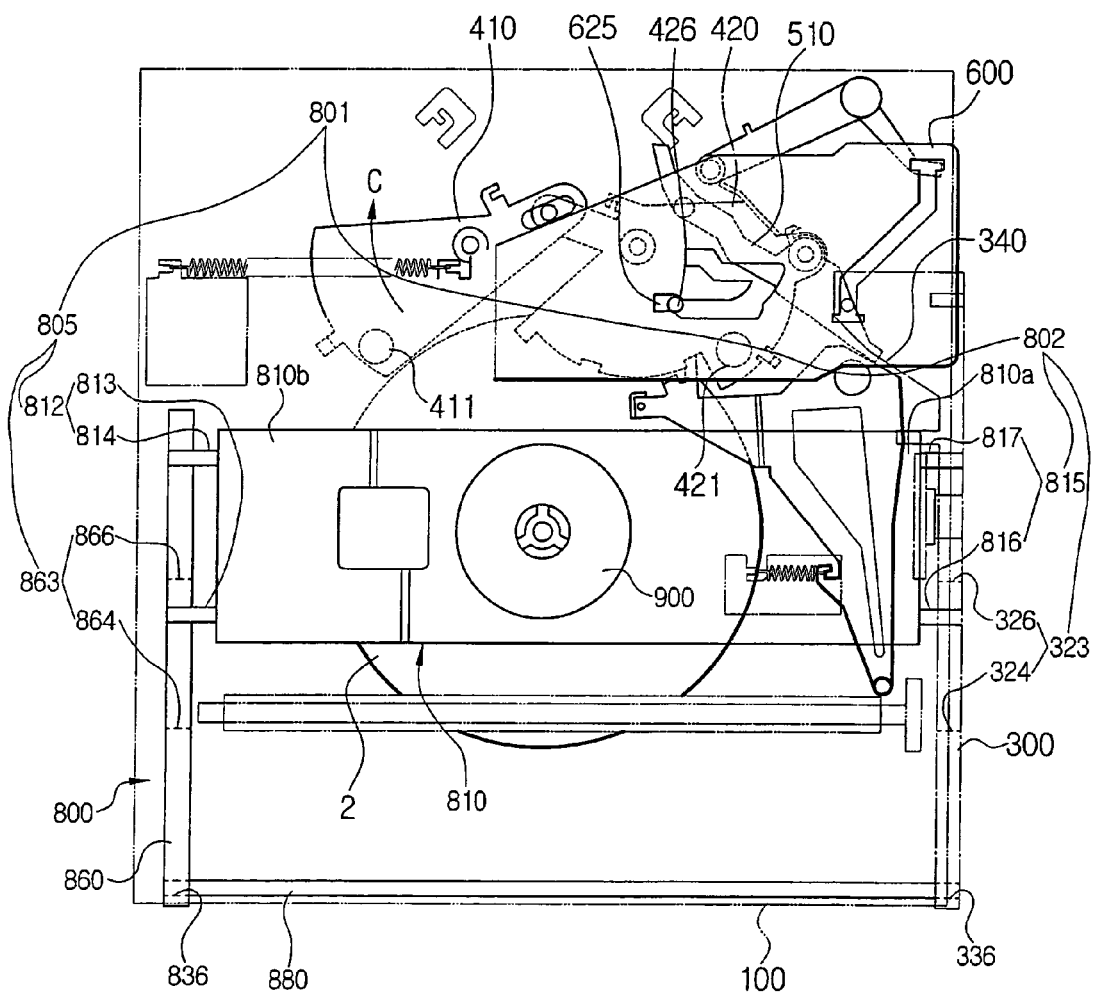

As depicted by phantom lines in FIG. 15, the second disc 2 is inserted into the underside of the main chassis 100 and engaged with the transfer roller 110. Then, while being rotated, the transfer roller 110 transfers the second disc 2 to the position depicted by solid lines in FIG. 16. In that event, because the second disc 2 has a small diameter unlike the first disc 1, the second disc 2 does not interfere with the locking lever 700. And, the second disc 2 comes into contact with one end of the second pushing lever 510 before it comes into contact with the first and second guide rollers 411, 421. If the second disc 2 is further inserted from this state, the second pushing lever 510 is pushed by the second disc 2 and rotated as shown in FIG. 17. In addition, the second pushing lever 510 pushes the first slider 300 in the A2 direction while being rotated. Then, like the case of inserting the first disc 1, the rack gear 310 is engaged with the driving gear 250, whereby the first slider 300 is continuously moved in the A2 direction, as shown in FIG. 8. If the first slider 300 is continuously moved in the A2 direction, the subordinate chassis 600 is guided by the cam lug 330 and moved in the B1 direction as shown in FIG. 17. And, the guide pin 426 is inserted into the second slit 625. In addition, while the subordinate chassis 600 is moved in the B1 direction, the lower edge 630 pushes the guide lug 730 of the locking lever 700, thereby rotating the locking lever 700 in the D direction. Thus, the locking lug 710 is released from the first locking groove 424.

Next, if the first slider 300 is fully moved in the A2 direction, the guide pin 426 is inserted into the second slit 625 and the second pivot plate 420 is rotated in a predetermined range of arc in the D direction. Of course, the first pivot plate 410 is rotated in the C direction in the linkage with the second pivot plate 420. Thus, the first and second guide lugs 411, 412 are separated from the second disc 2.

If the first slider 300 is fully moved in the A2 direction, the projection part 341 formed at the top end of the first slider 300 comes into contact with the cam part 511 of the second pushing lever 510 and rotates the second pushing lever 510. Accordingly, the second pushing lever 510 is rotated in the C direction and separated from the second disc 2 moved to the chucking position.

In addition, since the first slider 300 is moved along with the second slider 860 in the A2 direction by the connecting member 880, the first and second protrusion parts 815, 812 are moved to the descent slots 324c, 326c of the first and second guide slot parts 323, 863 and then lowered, and the chuck bracket 810 is positioned at the chucking position. As a result, the clamper 900 seats the second disc 2 on the turntable 950 in the rotatable state.

Of course, like the case of loading the first disc 1, if the second disc 2 is seated on the turntable 950, the hinge unit (not shown) of the guide roller 110 is guided and rotated by the cam slot 340, thereby the transfer roller 110 is lowered and separated from the second disc 2. As such, the turntable 950 is rotated in the state in which the second 2 is completely clamped to the turntable 950 and the optical pickup (not shown) is driven, whereby information is recorded into or reproduced from the second disc 2.

The unloading operations of the second disc 2 are performed in the reversed sequence with reference to the loading operations thereof, like the unloading operations of the first disc 1.

As described above, according to the present invention, because a chuck bracket for fixing a clamper for clamping a disc is directly driven by a first slider which is selectively connected to a power transmission unit and reciprocated without intervention of a separate power transmission member, power transmission to the chuck bracket is smooth and the operation of the chuck is smoothly executed.

In addition, if the present invention is constructed in such a way that both ends of the chuck bracket are lifted and lowered, the operating space of the chuck bracket becomes equal to the height for actually lifting and lowering the clamper, whereby it is possible to slim the entire thickness of a disc player.

While the preferred embodiments of the present invention have been shown and described in order to exemplify the principle of the present invention, the present invention is not limited to the specific embodiments. It will be understood that various modifications and changes can be made by one skilled in the art without departing from the spirit and scope of the invention as defined by the appended claims. Therefore, it shall be considered that such modifications, changes and equivalents thereof are all included within the scope of the present invention.

What is claimed is:

1. A disc chucking apparatus of a disc player comprising:
   a chuck bracket having a clamper for clamping a disc to a turntable; and
   a lifting/lowering unit for lifting or lowering the chuck bracket to move the disc to a clamping position where the disc is seated on the turntable in the rotatable state or to a clamping standby position where the disc is separated from the turntable,
   wherein the lifting/lowering unit comprises:
      a first protrusion part formed at one of first and second ends of the chuck bracket; and
      a first slider having a first guide slot part formed to be opposite to the first protrusion part so that the first guide slot part receives and guides the first protrusion part to lift or lower the chuck bracket, wherein the first slider is mounted to be capable of reciprocating in the disc loading direction and selectively connected to a power transmission unit, which transmits power from a driving motor, depending on its moving position, thereby being reciprocated.

2. The disc chucking apparatus as claimed in claim 1, wherein the lifting/lowering unit further comprises:
   a second protrusion part formed at the other of the first and second ends of the chuck;
   a second slider having a second guide slot part formed to be opposite to the second protrusion part so that the second guide slot part receives and guides the second protrusion part to lift or lower the chuck bracket, wherein the second slider is mounted to be capable of reciprocating in the disc loading direction; and
   a connecting member for connecting the second slider with the first slider.

3. The disc chucking apparatus as claimed in claim 2, wherein the first and second protrusion parts each have two protrusion pins and the first and second guide slot parts each have two guide slots.

4. The disc chucking apparatus as claimed in claim 3, wherein each of the guide slots has an ascent slot, a descent slot and a slant slot interconnecting the ascent slot and the descent slot.

5. The disc chucking apparatus as claimed in claim 2, wherein the connecting member consists of one of a rod or a bar, of which the opposite ends are connected to the first and second sliders, respectively.

6. The disc chucking apparatus as claimed in claim 2, wherein the connecting member comprises:
   a shaft rotatably mounted on the main chassis;
   first and second pinion gears fixed to the opposite ends of the shaft, respectively; and
   first and second rack gears formed in the first and second sliders, respectively, to be meshed with the first and second pinion gears.

7. The disc chucking apparatus as claimed in claim 1, wherein the lifting/lowering unit further comprises a hinge axle formed at the other of the first and second ends of the chuck bracket.

8. A disc chucking apparatus of a disc player comprising:
   a chuck bracket having a clamper for clamping a disc to a turntable; and
   a lifting/lowering unit for lifting or lowering the chuck bracket to move the disc to a clamping position where the disc is seated on the turntable in the rotatable state or to a clamping standby position where the disc is separated from the turntable,
   wherein the lifting/lowering unit comprises:
      first and second protrusion parts formed at first and second ends of the chuck bracket, respectively;
      a first slider having a first guide slot part formed to be opposite to the first protrusion part so that the first guide slot part receives and guides the first protrusion part to lift or lower the chuck bracket, wherein the first slider is mounted to be capable of reciprocating in a predetermined direction and selectively connected to a power transmission unit, which transmits power from a driving motor, at the time of loading or unloading the disc, thereby being reciprocated;
      a second slider having a second guide slot part formed to be opposite to the second protrusion part so that the second guide slot part receives and guides the second protrusion part to lift or lower the chuck bracket, wherein the second slider is mounted to be capable of reciprocating in the direction of the reciprocating direction of the first slider; and a connecting member for connecting the second slider with the first slider.

9. The disc chucking apparatus as claimed in claim 8, wherein the first and second protrusion parts each have two protrusion pins and the first and second guide slot parts each have two guide slots.

10. The disc chucking apparatus as claimed in claim 9, wherein each of the guide slots has an ascent slot, a descent slot and a slant slot interconnecting the ascent slot and the descent slot.

11. The disc chucking apparatus as claimed in claim 8, wherein the connecting member consists one of a rod and a bar, of which the opposite ends are connected to the first and second sliders, respectively.

12. The disc chucking apparatus as claimed in claim 8, wherein the connecting member comprises:
 a shaft rotatably mounted on the main chassis;
 first and second pinion gears fixed to the opposite ends of the shaft, respectively; and
 first and second rack gears formed in the first and second sliders, respectively, to be meshed with the first and second pinion gears.

13. A disc player for recording information into or reproducing recorded information from either a first disc having a first size or a second disc having a second size, the disc player comprising:
 a first slider mounted on a main chassis to be capable of reciprocating in the first or second disc loading direction and selectively connected to a power transmission unit for transmitting power from a driving motor depending on its moving position, thereby being reciprocated; and
 a disc chucking apparatus comprising a chuck bracket having a clamper for clamping a disc to a turntable, and a lifting/lowering unit linked with the first slider to lift or lower the chuck bracket so as to move the first or second disc to a clamping position where the disc is seated on the turntable in the rotatable state or to a clamping standby position where the first or second disc is separated from the turntable,
 wherein the lifting/lowering unit comprises:
 a first protrusion part formed at one of first or second ends of the chuck bracket; and
 a first guide slot part formed in the first slider opposite to the first protrusion part to receive and guide the first protrusion part so as to lift or lower the chuck bracket.

14. The disc player as claimed in claim 13, wherein the lifting/lowering unit further comprises:
 a second protrusion part formed at the other of the first and second ends of the chuck;
 a second slider having a second guide slot part formed to be opposite to the second protrusion part so that the second guide slot part receives and guides the second protrusion part to lift or lower the chuck bracket, wherein the second slider is mounted to be capable of reciprocating in the disc loading direction; and
 a connecting member for connecting the second slider with the first slider.

15. The disc player as claimed in claim 14, wherein the first and second protrusion parts each have two protrusion pins and the first and second guide slot parts each have two guide slots.

16. The disc player as claimed in claim 15, wherein each of the guide slots has an ascent slot, a descent slot and a slant slot interconnecting the ascent slot and the descent slot.

17. The disc player as claimed in claim 14, wherein the connecting member consists of one of a rod or a bar, of which the opposite ends are connected to the first and second sliders, respectively.

18. The disc player as claimed in claim 14, wherein the connecting member comprises:
 a shaft rotatably mounted on the main chassis;
 first and second pinion gears fixed to the opposite ends of the shaft, respectively; and
 first and second rack gears formed in the first and second sliders, respectively, to be meshed with the first and second pinion gears.

19. The disc player as claimed in claim 13, wherein the lifting/lowering unit further comprises a hinge axle formed at the other of the first and second ends of the chuck bracket.

20. The disc player as claimed in claim 13, further comprising: a subordinate chassis mounted on top of the main chassis capable of reciprocating perpendicular to the first or second disc loading direction in linkage with the first slider.

* * * * *